United States Patent
Zhong

(10) Patent No.: US 10,612,596 B1
(45) Date of Patent: Apr. 7, 2020

(54) ANTI-CREEP DEEP GROOVE BALL BEARING

(71) Applicant: Schaeffler Technologies AG & Co. KG, Herzogenaurach (DE)

(72) Inventor: Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/139,338

(22) Filed: Sep. 24, 2018

(51) Int. Cl.
*F16C 33/58* (2006.01)
*F16C 33/38* (2006.01)
*F16C 19/06* (2006.01)
*F16C 35/063* (2006.01)
*F16C 35/067* (2006.01)

(52) U.S. Cl.
CPC ........ F16C 33/586 (2013.01); F16C 33/3806 (2013.01); F16C 19/06 (2013.01); F16C 35/063 (2013.01); F16C 35/067 (2013.01)

(58) Field of Classification Search
CPC .... F16C 19/183; F16C 19/184; F16C 19/541; F16C 19/546; F16C 19/56; F16C 33/412; F16C 33/414; F16C 33/416; F16C 35/063; F16C 35/067; Y10T 29/49686
See application file for complete search history.

(56) References Cited

U.S. PATENT DOCUMENTS

| 2,018,949 | A | * | 10/1935 | Couch | B61F 15/14 384/459 |
| 3,132,594 | A | * | 5/1964 | Shiley | F01D 25/246 417/407 |
| 3,890,780 | A | * | 6/1975 | Hagemeister | F01D 25/16 60/39.08 |
| 4,602,874 | A | * | 7/1986 | Neugebauer | B23Q 1/70 384/476 |
| 5,028,152 | A | | 7/1991 | Hill et al. | |
| 6,398,509 | B1 | * | 6/2002 | Okazaki | B23Q 1/70 417/44.1 |
| 8,684,608 | B2 | | 4/2014 | Ince et al. | |
| 2009/0080824 | A1 | | 3/2009 | Joki et al. | |
| 2012/0093453 | A1 | | 4/2012 | Horvat | |
| 2012/0207420 | A1 | * | 8/2012 | Bostwick | H02K 5/1732 384/537 |
| 2015/0003764 | A1 | * | 1/2015 | Kobayashi | F16C 25/083 384/447 |
| 2016/0123388 | A1 | * | 5/2016 | Falomi | F16C 35/061 310/90.5 |

FOREIGN PATENT DOCUMENTS

| DE | 10 2015 200 298 A1 | 7/2016 | |
| JP | 2005003149 A | * 1/2005 | ............ F16C 19/184 |
| JP | 2014159868 A | * 9/2014 | .......... F15B 15/2807 |

* cited by examiner

Primary Examiner — Phillip A Johnson
(74) Attorney, Agent, or Firm — Volpe and Koenig, P.C.

(57) ABSTRACT

An anti-creep deep groove ball bearing is provided for a transmission of a vehicle. The bearing has rolling elements and two rings, each ring having a groove. One of the grooves is a half groove while the other groove is a full deep groove. The half groove arrangement allows for additional rolling elements and a greater thickness in one of the rings.

14 Claims, 4 Drawing Sheets

| Table 1. Anti-Creep DGBB and Standard DGBB Comparison for Commonly Used Ball Bearings | | | | | | | |
|---|---|---|---|---|---|---|---|
| Bearing Series | Design | | Ball Counts | Ball Size Dw [mm] | Outer Ring Thickness t [mm] | Anti-Creep Factor | Load Rating [N] | |
| | | | | | | | Dynamic | Static |
| 6306 | Standard | DGBB | 8 | 12.5 | 4.25 | 4.7 | 29000 | 16200 |
| | Anti-creep | ACDGBB | 11 | 11.33 | 5.69 | 2.47 | 20700 | 13000 |
| 6307 | Standard | DGBB | 8 | 13.5 | 5.25 | 4.2 | 33000 | 18900 |
| | Anti-creep | ACDGBB | 11 | 12.80 | 6.41 | 2.42 | 25500 | 16200 |
| 6308 | Standard | DGBB | 8 | 15.0 | 4.96 | 5.1 | 40500 | 24000 |
| | Anti-creep | ACDGBB | 11 | 14.49 | 7.38 | 2.35 | 32000 | 20600 |

ANTI-CREEP DEEP GROOVE BALL BEARING

FIELD OF INVENTION

The present invention relates to deep groove ball bearings, and more particularly to a deep groove ball bearing designed for preventing creep and wear while being relatively inexpensive and easy to manufacture.

BACKGROUND

Rolling element bearings, such as ball bearings, are known in a variety of applications for the mounting of shafts and other rotatable machine components, particularly in vehicle transmissions. The ball bearings are positioned between inner and outer rings, which have grooves for receiving and guiding the ball bearings. Deep-groove ball bearings (DGBB) are known to be used in high-performance applications.

In high-speed applications such as continuously-variable transmissions (CVT), hybrid transmissions, e-axles, and electric vehicles, a DGBB experiences relatively high speed, load, and temperatures. In these conditions, problems of creep and wear can lead to debris production and eventual bearing failure. The housing of the transmission, at its interface with the outer ring, may be particularly susceptible to creep and is often formed of a softer material than the DGBB. However, creep may cause damage to either part of the housing/outer ring interface or either part of the shaft/inner ring interface, especially at high operating temperatures. Previous solutions include specialized coatings and/or angular contact bearings implemented in conjunction with a spring load device that compensates for a loss of preload due to thermal expansion of the housing. These solutions are significantly more expensive and complicated than a standard DGBB.

The number of balls in a DGBB directly correlates to a bearing assembly's performance, but is necessarily limited by the assembly method and space constraints within the transmission. Likewise the radial thickness of bearing rings correlates to improved performance subject to space constraints.

SUMMARY

Briefly stated, a deep groove bearing is provided, having a plurality of bearing elements, a cage for separating the bearing elements, a first ring, and a second ring. The first ring includes a full deep groove for receiving the bearing elements and supporting the bearing elements in both axial directions of the bearing. The second ring includes a half groove for receiving the bearing elements and supporting the bearing elements in a single axial direction of the bearing. Preferably, the bearing elements are inserted into the full deep groove and then held in position by the cage as the second ring is assembly with the first ring. The preferred bearing elements are balls in order to form a DGBB.

In another aspect, a bearing set is provided for mounting to a shaft, the bearing set including a first deep groove bearing and a second deep groove bearing. The first deep groove bearing has a plurality of bearing elements, a cage for separating the bearing elements, a first ring, and a second ring. The first ring includes a full deep groove for receiving the bearing elements and supporting the bearing elements in both axial directions of the first bearing. The second ring includes a half groove for receiving the bearing elements and supporting the bearing elements in a single axial direction of the first bearing. The second deep groove bearing has a plurality of second bearing elements, a second cage for separating the second bearing elements, a third ring, and a fourth ring. The third ring includes a third groove for receiving the second bearing elements and supporting the second bearing elements in both axial directions of the second bearing. The fourth ring includes a fourth groove for receiving the second bearing elements and supporting the second bearing elements in a single axial direction of the second deep groove bearing. The first and second deep groove bearings can be arranged in an X-arrangement or an O-arrangement.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
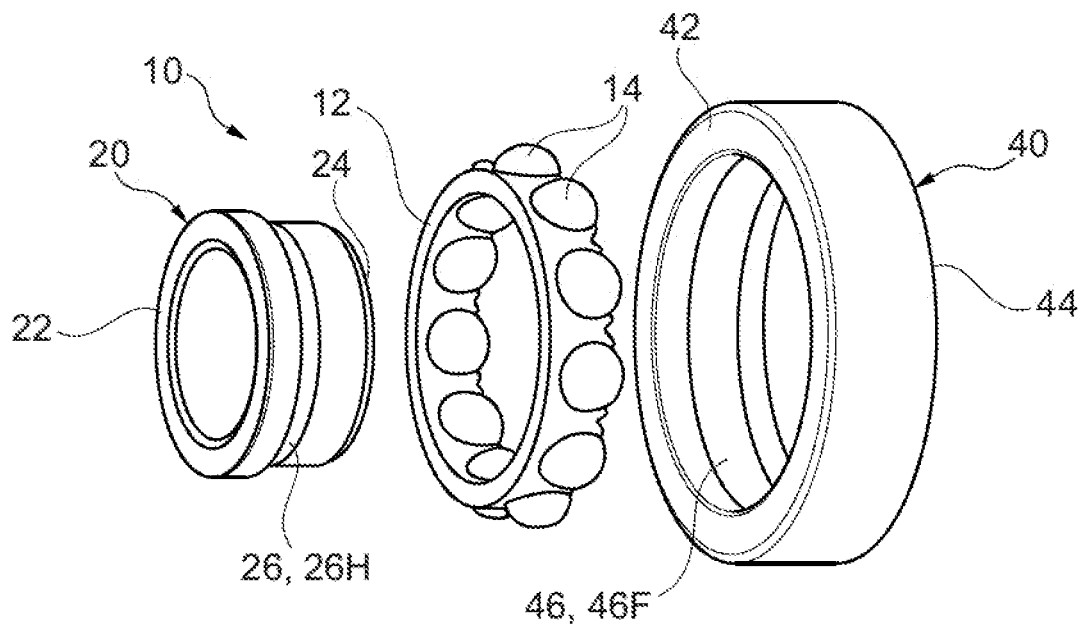
FIG. 1 is an exploded perspective view of a bearing assembly in accordance with an embodiment of the present application.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

"About" as used herein when referring to a measurable value such as an amount, a temporal duration, and the like, is meant to encompass variations of ±5% from the specified value.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
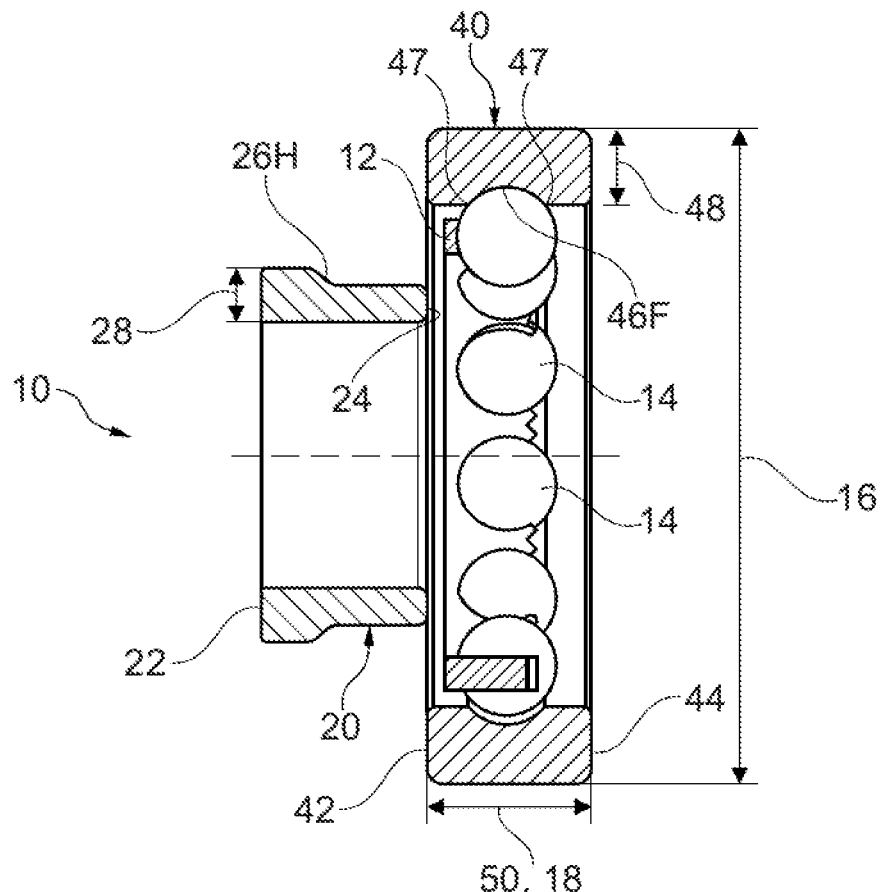
FIG. 2 is a partly-exploded side cross-sectional view of the bearing assembly of FIG. 1.
Figures 3, 4:
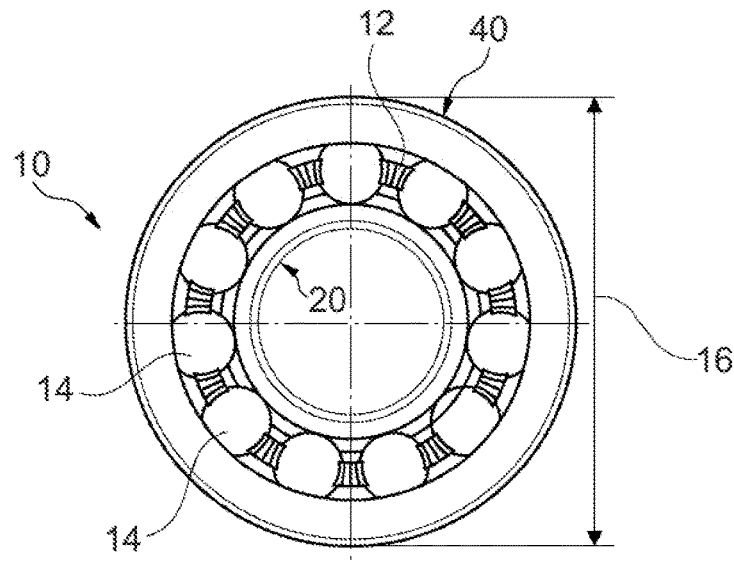
FIG. 3 is an axial end view of the bearing assembly of FIG. 1 in an assembled state.
FIG. 4 is a table comparing characteristics of a bearing assembly in accordance with an embodiment of the present application to a typical bearing assembly, with respect to three common ball bearings.

Referring to FIG. 1, a bearing assembly 10 is shown with a bearing cage 12 separating a plurality of rolling elements 14. The bearing assembly 10 of the present disclosure is also referred to generally as an Anti-Creep Deep Groove Ball Bearing, Anti-Creep DGBB, or ACDGBB. The rolling elements 14 may be, for example, ball bearings. As shown in FIGS. 2-3, the bearing assembly 10 defines an envelope diameter 16 in a radial dimension and an envelope length 18 in an axial dimension that are equal to a standard bearing 7 as discussed below.

Returning to FIG. 1, the bearing assembly 10 includes an inner ring 20 with first and second axial ends 22, 24 with a groove 26 therebetween. The bearing assembly also includes an outer ring 40 with first and second axial ends 42, 44 with a groove 46 therebetween. In the embodiment illustrated in FIG. 1, the groove 26 of the inner ring 20 is a half groove 26H (i.e., only axially supporting a rolling element on one side) and the groove 46 of the outer ring 40 is a full deep groove 46F. As will be discussed further below and shown in FIGS. 7A-7B, the respective features of the inner and outer rings 20, 40 may be reversed such that the groove 26 is a full grove 26F and the groove 46 is a half groove 4611.

One of ordinary skill in the art would appreciate the full deep groove 26F or 46F of the present application constitutes a "deep" groove such that the bearing constitutes a DGBB. Such a full deep groove 26F or 46F has a pair of axial shoulders 27 or 47 that both extend partially around the rolling elements 14. In other words, the axial shoulders 27 or 47 extend an equal radial distance coextensively with a portion of a diameter of the rolling elements 14. Due to the deep groove, a DGBB is designed to primarily receive radial loads with some capacity for bearing axial loads. The full deep groove 26F or 46F gives the ACDGBB the capability to position the shaft 3 and does not require a preload to function, in the same manner as a DGBB. By contrast, an angular bearing (or angular contact ball bearing, "ACBB") does not have a full deep groove and is designed to receive combined axial and radial loads, typically in one axial direction based on the contact angles. An ACBB cannot position the shaft 3 and requires a preload to function properly.

As shown in FIGS. 1 and 2, the inner ring 20 has a half groove 26H that only extends radially at the first axial end 22 of the inner ring. As such, the rolling elements 14 are only axially supported by the inner ring 20 in one axial direction, whereas the outer ring 40 and groove 46 support the rolling elements in both axial directions.

FIG. 2 illustrates the radial thickness 28 of the inner ring 20 and radial thickness 48 of the outer ring 40. Each radial thickness 28, 48 is also referred to simply as the thickness of the respective ring 20, 40. In the illustrated embodiment of FIGS. 1-3 and particularly as described in FIG. 4, the thickness 48 of the outer ring 40 is greater than the thickness 28 of the inner ring 20 and thicker than a typical outer bearing ring (also referred to as a Standard DGBB or SDGBB) for a bearing assembly 10 of this envelope size. This greater thickness 48 is facilitated by a smaller diameter of rolling elements 14 relative to a typical bearing assembly. The increased thickness 48 prevents creep of the outer ring 40.

FIG. 2 also shows an intermediate state of assembly for the bearing assembly 10. The order of assembly is dictated by which one of the inner and outer rings 20, 40 has a full deep groove. Here, the outer ring 40 has a full deep groove 46F, so the rolling elements 14 are first placed in the full deep groove 46F. Next the cage 12 is snapped on to hold the rolling elements in place. Finally, the inner ring 20 (i.e., the ring having the groove 26 that is a half groove 26H) is slid into the outer ring 40. By this method, a maximum number of rolling elements 14 can be installed, and the rolling elements 14 do not undergo significant pressure during assembly.

Testing and finite element analysis have shown that bearing performance in preventing creep can be predicted based on an "Anti-Creep Factor," which is the ratio of pitch interval distance between bearing elements to outer ring thickness. In particular, there is no creep for a bearing with an Anti-Creep Factor ≤3.3. As shown in FIG. 4, the Anti-Creep Factor for the bearing assembly 10 of the present disclosure is significantly improved over a Standard DGBB with the same bearing series. The Anti-Creep Factor of each exemplary ACDGBB design is below 3.3, whereas the corresponding Anti-Creep Factor of each Standard DGBB design is above 3.3.

In the exemplary comparisons for standard bearings in FIG. 4, the ACDGBB design increases the number of bearing elements 14 (balls) from 8 to 11, while the Anti-Creep Factor is about 46% to about 58% that of the comparable Standard DGBB. The exemplary Anti-Creep Factor ranges from about 2.1 to about 2.5, although Anti-Creep Factors ranging between about 1 to about 3.3 may be achieved depending on the application. In general for various applications, the ACDGBB design of the present application can provide an Anti-Creep Factor of about 40%-65% or about 25%-75% that of the comparable Standard DGBB designs.

Figures 5A, 5B:
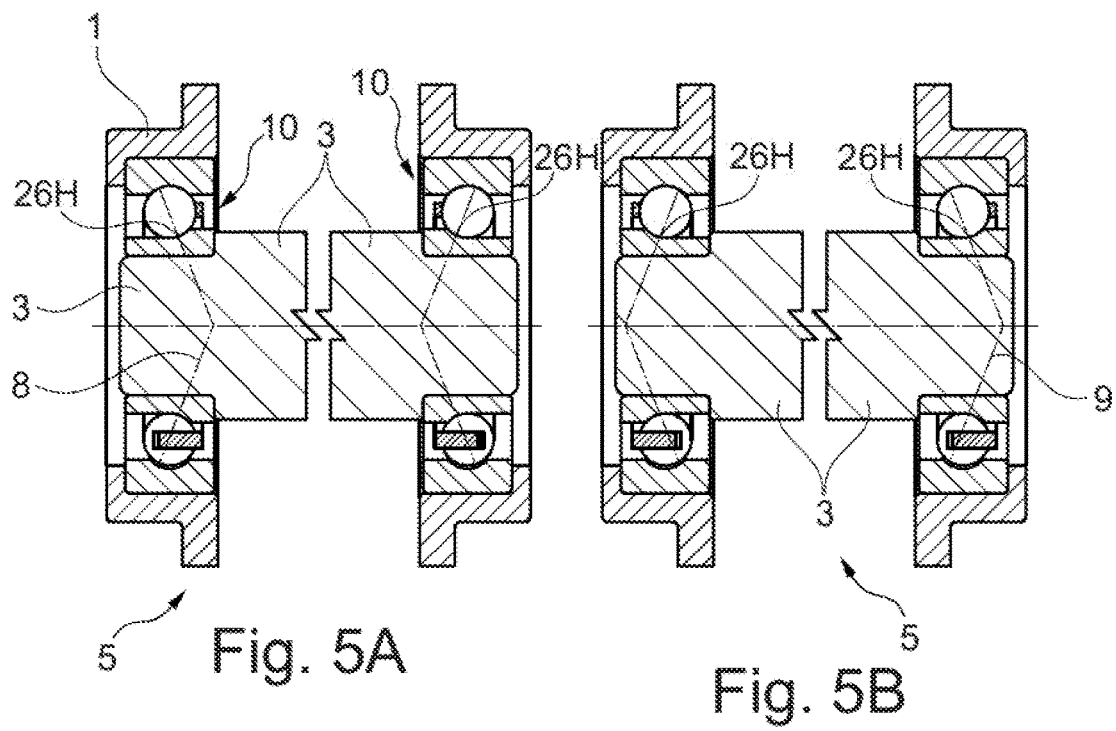
FIG. 5A is a side cross-sectional view of a multi-bearing set mounted within a transmission in an X-arrangement.
FIG. 5B is a side cross-sectional view of the multi-bearing set of FIG. 5A mounted within a transmission in an O-arrangement.
Figures 6A, 6B:
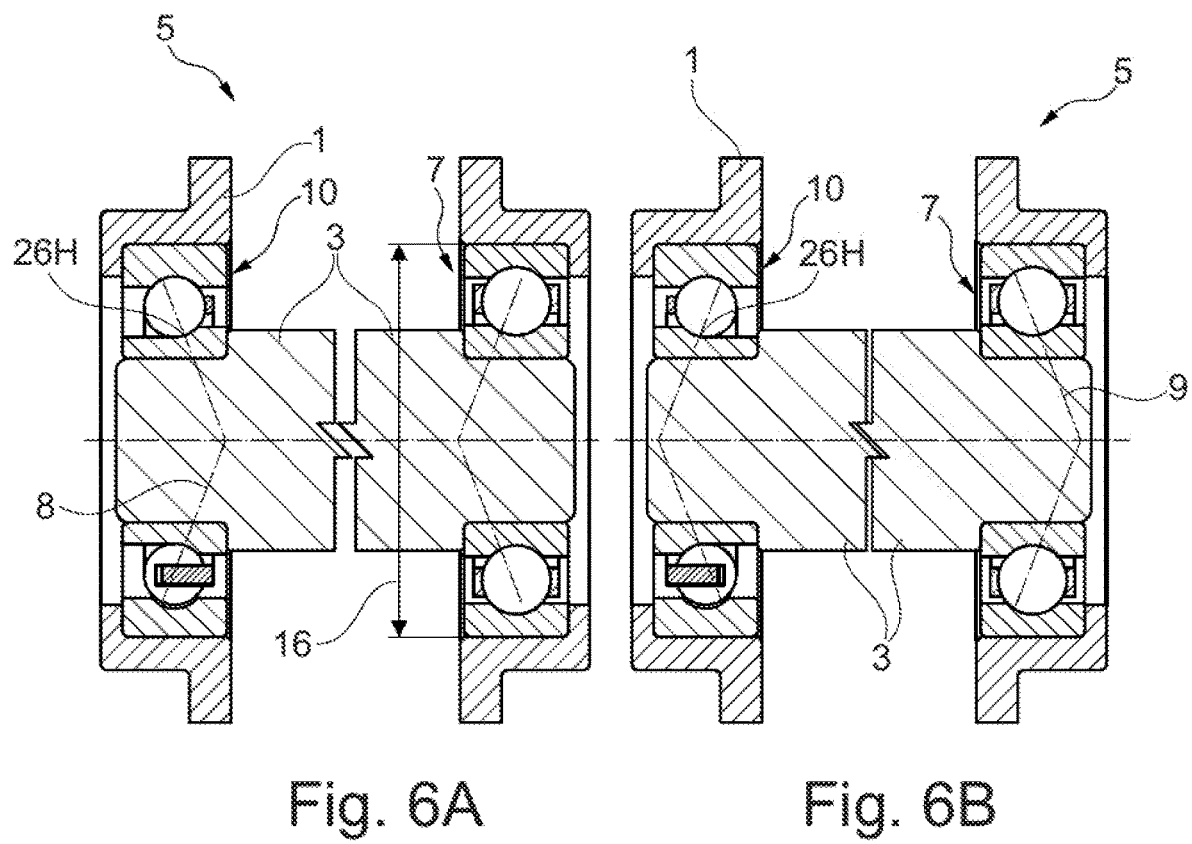
FIG. 6A is a side cross-sectional view of another multi-bearing set mounted within a transmission in an X-arrangement.
FIG. 6B is a side cross-sectional view of the multi-bearing set of FIG. 6A mounted within a transmission in an O-arrangement.

Because of the half groove 26H or 4611, the ACDGBB tends to support axial loads in only or substantially one direction. Therefore, it may be preferable to use a multi-bearing set 5, illustrated in FIGS. 5A-6B as pairs of bearings. FIGS. 5A-5B show a multi-bearing set 5 that is a pair of ACDGBB bearing assemblies 10 mounted between the housing 1 and the shaft 3. FIGS. 6A-6B show a multi-bearing set 5 that is an ACDGBB bearing assembly 10 combined with a Standard DGBB bearing assembly 7. The orientation of the half groove 26H defines the multi-bearing set as an X-arrangement 8 (FIGS. 5A, 6A) based on the pressure angles or an O-arrangement 9 (FIGS. 5B, 6B), either of which may be implemented depending on anticipated axial loads. One of ordinary skill in the art would appreciate that the Standard DGBB bearing assembly 7 may have a cage 12 and a plurality of rolling elements 14 similar to those of the ACDGBB bearing assembly 10, although with fewer rolling elements 14 due to the assembly method required for full deep groove inner and outer rings.

Figures 7A, 7B:
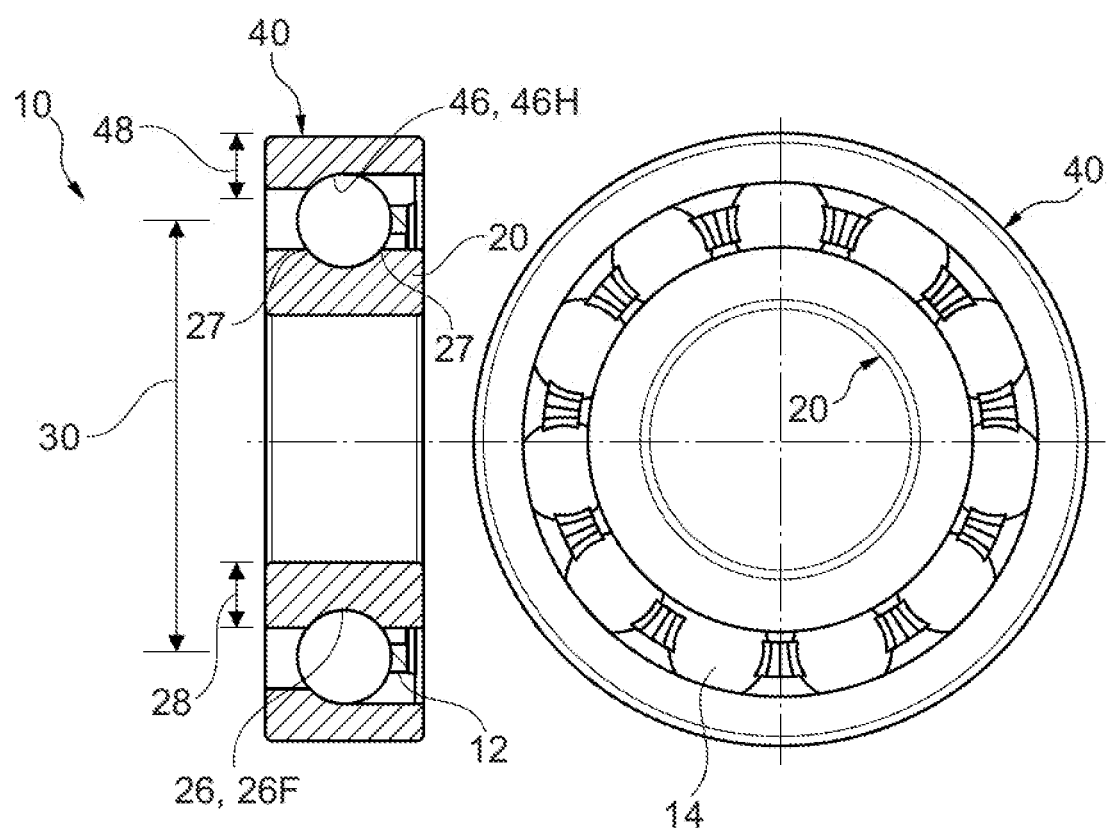
FIG. 7A is a side cross-sectional view of a bearing assembly in accordance with another embodiment of the present application.
FIG. 7B is an axial end view of the bearing assembly of FIG. 7A.

FIGS. 7A and 7B illustrate another embodiment of the present application wherein the half groove 4611 is provided on the outer ring 40 instead of the inner ring 20. This embodiment provides a greater thickness 28 of the inner ring 20 and a smaller thickness 48 of the outer ring 40. As a consequence, a pitch diameter 30 of the rolling elements 14 in this embodiment is greater than that of the embodiment illustrated in FIGS. 1-3. As noted above, this embodiment particularly prevents creep in the inner ring 20.

For installation of the bearing assembly 10 of FIGS. 1-3 on a transmission, preferably a slip fit is provided between the housing 1 and the bearing assembly 10 at an outer diameter of the outer ring 40, and a press fit is provided between the shaft 3 and an inner diameter of the inner ring 20. Installation of the bearing assembly 10 of FIGS. 7A-7B is preferably with a press fit to the housing 1 and a slip fit to the shaft 3. However, one of skill in the art would appreciate that in either embodiment, the slip fit and press fit may be reversed from the above, depending on design and installation considerations. In a preferred embodiment, the housing 1 is made of aluminum and the shaft 3 is made of steel, although other materials are contemplated.

One skilled in the art would appreciate that the test results shown in FIG. 4 are illustrative of the benefits of the ACDGBB design of the present application, but are not limiting as far as applications or bearing series. The various ratios, dimensions, and number of bearing elements discussed above may vary depending on the application, material choice, and the like. Moreover, it is counterintuitive in the art to design a high-performance bearing assembly 10 with a half-groove, which necessarily restricts performance relative to axial loads. Likewise it is unexpected to achieve an increased ring thickness with comparable bearing performance for a predetermined/fixed envelope diameter.

The bearing assembly 10 shown above as an ACDGBB provides significant advantages over prior Standard DGBB solutions. Both the increased number of rolling elements 14 and the increased thickness 48 of the outer ring 40 contribute to reducing creep in the outer ring. In particular, the number of rolling elements 14 correlates to spreading loads across the rings, and the thickness 48 correlates to mechanical and material strength. The greater number of rolling elements 14 also mitigates the decreased diameter of each rolling element. In the same manner, for embodiments with a half groove 46H on the outer ring 40, the increased number of rolling elements 14 and the increased thickness 28 of the inner ring 20 contribute to reducing creep in the inner ring. These performance advantages are obtained at comparable cost and manufacturing simplicity to Standard DGBB, and are thus cheaper/easier than previous anti-creep solutions.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. In particular, the bearing assembly 10 of the illustrated embodiments may be provided on various devices other than an automobile transmission, and are generally applicable anywhere that DGBB ring creep occurs. The multi-bearing set 5 may include more than two bearing assemblies 7/10, for example, three, four, five, or more bearing assemblies 7/10 may be provided on a shaft 3. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

1. Housing
3. Shaft
5. Multi-Bearing Set
7. Standard Deep Groove Bearing Assembly
8. X-Arrangement
9. O-Arrangement
10. Bearing Assembly
12. Cage
14. Bearing Elements
16. Envelope Diameter
18. Envelope Length
20. Inner Ring
22. First Axial End
24. Second Axial End
26. Groove
26H. Half Groove
26F. Full Deep Groove
27. Shoulder
28. Thickness
30. Pitch Diameter
40. Outer Ring
42. First Axial End
44. Second Axial End
46. Groove
46H. Half Groove
46F. Full Deep Groove
47. Shoulder
48. Thickness
50. Length

What is claimed is:

1. A deep groove bearing, comprising:
a plurality of bearing elements;
a cage for separating the bearing elements;
a first ring including:
a full deep groove for receiving the bearing elements and supporting the bearing elements in both axial directions of the bearing;
a second ring including:
a half groove for receiving the bearing elements and supporting the bearing elements in a single axial direction of the bearing, and
the bearing has a ratio of a pitch interval distance to a thickness of the first ring, and the ratio is 2.1-2.5.

2. The bearing of claim 1, wherein the second ring is an inner ring of the bearing.

3. The bearing of claim 1, wherein the second ring is an outer ring of the bearing.

4. The bearing of claim 1, wherein the plurality of bearing elements are spherical balls.

5. A bearing set for mounting to a shaft, comprising:
a first deep groove bearing, having:
a plurality of bearing elements,
a cage for separating the bearing elements,
a first ring including:
a full deep groove for receiving the bearing elements and supporting the bearing elements in both axial directions of the first bearing, and
a second ring including:

a half groove for receiving the bearing elements and supporting the bearing elements in a single axial direction of the first bearing; and a second deep groove bearing, having:
  a plurality of second bearing elements;
  a second cage for separating the second bearing elements;
  a third ring including:
    a third groove for receiving the second bearing elements and supporting the second bearing elements in both axial directions of the second bearing; and
  a fourth ring including:
    a fourth groove for receiving the second bearing elements and supporting the second bearing elements in at least one axial direction of the second bearing, and
at least one of:
  (i) the first bearing has a first ratio of a pitch interval distance to a thickness of the first ring, and the first ratio is 2.1-2.5; or
  (ii) the second bearing has a second ratio of a pitch interval distance to a thickness of the third ring or the fourth ring, and the second ratio is 2.1-2.5.

6. The bearing set of claim 5, wherein the third groove and the fourth groove are full deep grooves.

7. The bearing set of claim 6, wherein the first bearing and the second bearing have a substantially equal envelope diameter, and wherein the second bearing has fewer rolling elements than the first bearing.

8. The bearing set of claim 5, wherein the second ring is an inner ring of the first bearing.

9. The bearing set of claim 5, wherein the third groove is a half groove and the fourth groove is a full deep groove.

10. The bearing set of claim 9, wherein the second ring is an inner ring of the first bearing and the third ring is an inner ring of the second bearing.

11. The bearing set of claim 5, wherein the half groove of the second ring is oriented to provide the bearing set in an X-arrangement.

12. The bearing set of claim 5, wherein the half groove of the second ring is oriented to provide the bearing set in an O-arrangement.

13. A transmission comprising:
  a housing;
  a shaft;
  the bearing set of claim 5, wherein
  the bearing set is slip fit within the housing and press fit onto the shaft.

14. A method for assembling a deep groove ball bearing, comprising:
  providing a first ring having a full deep groove;
  placing a plurality of bearing elements in the full deep groove to support the bearing elements in both axial directions of the bearing;
  mounting a cage to the first ring and separating each of the plurality of bearing elements via the cage;
  sliding a second ring axially to engage the plurality of bearing elements, wherein the second ring has a half groove that supports the bearing elements in a single axial direction of the bearing.

* * * * *